INVENTOR
Claude Bethel

Patented Aug. 20, 1929.

1,725,127

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE GEAR.

Application filed September 8, 1923. Serial No. 661,556.

My invention relates to gear-wheels, more especially to flexible gear-wheel structures of the type in which the hub construction is such as will permit of certain movements thereof relative to the gear teeth or working rim portion.

It is among the objects of my invention to provide a flexible gear-wheel structure having novel features of construction that facilitate the assembling and operation of the several co-operating parts.

It is a further object of my invention to provide a gear-wheel structure of the above-designated character which shall be of simple, compact and durable mechanical construction and which shall have relatively great resilient characteristics and torque-transmitting capacities.

In my copending application, Serial No. 661,554, filed September 8, 1923, I have described a gear-wheel in which the hub member is movable relative to the gear teeth of the working rim portion for the purpose of permitting misalinement and displacement of the shaft or axle member on which the hub may be mounted, the gear-wheel further embodying resilient elements that permit of yielding annular movement of the rim on the hub. The universal function of the hub is developed by a spherically-curved engaging surface for the hub and rim and my present invention is especially directed to means for assembling a structure of this type in a simple and expedient manner.

In the accompanying drawing constituting a part hereof and in which like reference characters designate like parts, Fig. 1 is a side elevational view of a gear-wheel embodying the principles of my invention;

Figs. 1, 2 and 3 illustrate diagrammatically, details of my invention in which spring elements or other connecting means have been omitted for the sake of clearness.

Figure 1:
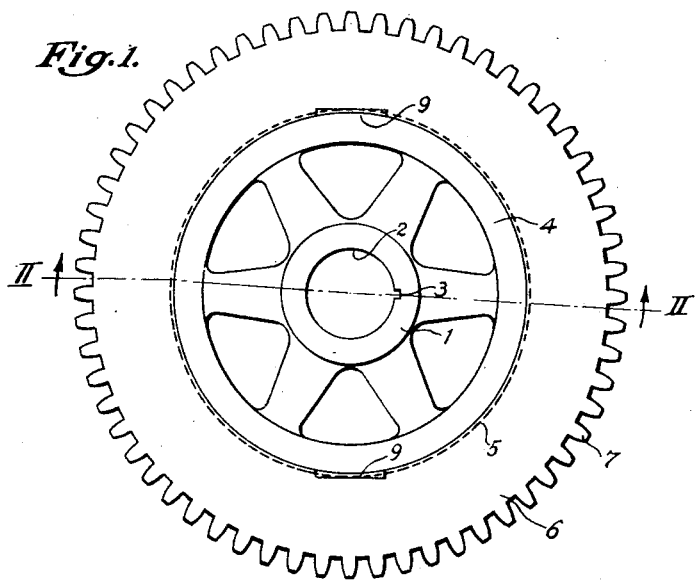
Figure 3:
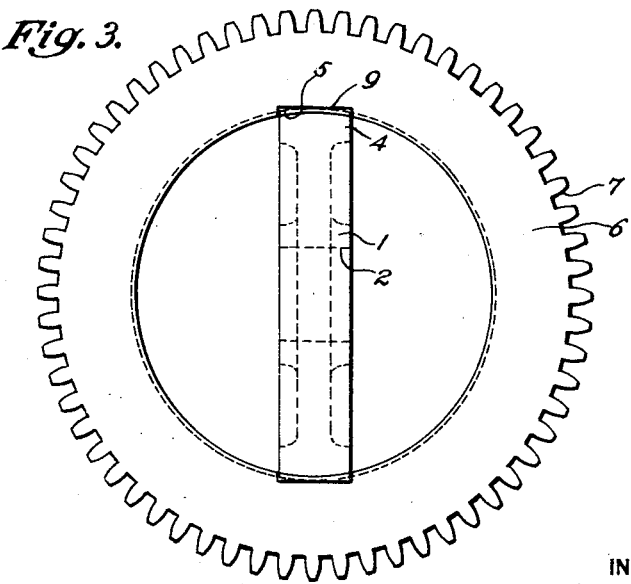
Fig. 3 is an elevational view showing the relative positions of the hub and rim by means of which they may be assembled or disengaged.

Referring to Fig. 1, the structure here shown comprises a spoked hub member 1 having a central opening 2 that is provided with a key-way 3 by which the hub member is mounted and secured to a suitable drive shaft (not shown). The outer rim 4 of the hub member is provided with a spherically curved surface 5, the radius of which is equal to the radius of the extreme diameter of the hub. A gear rim 6 having a fluted outer surface constituting gear teeth 7 is provided with a correspondingly shaped seating portion 8, which is adapted to co-operatively engage the surface 5 of the hub 1. As shown in Figs. 1 and 3, the rim portion 6 is provided with a pair of recesses or slotted openings 9 in alinement with each other and the center line of the hub 1.

Figure 2:
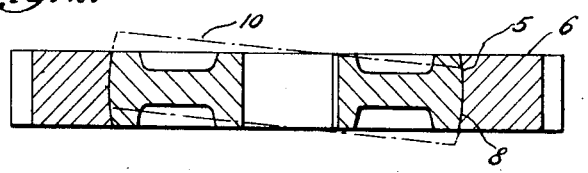
Fig. 2 is a cross-sectional view thereof taken along the line II—II of Fig. 1.

It is obvious that the hub member 1 may be disposed in any position relative to the rim 6, as shown by the dotted lines 10, Fig. 2 and the transverse position of the hub in Fig. 3. This universal movement of the hub member permits locating it as shown in Fig. 3 to have it register with the slots 9 in the gear rim. These slots are of substantially the same dimensions as the hub in width and depth so that when the latter is disposed in the position shown in Fig. 3 it may readily be extracted from the rim 6.

The members are assembled in the same manner, namely, the hub member 1 is inserted in the slots 9 with its axis disposed transversely to the axis of the gear rim. The hub may then be so pivoted that its axis coincides with that of the rim as shown in Fig. 1.

It is physically impossible to disengage the hub and rim member in operation as the former is secured on a shaft and is usually provided with an extending hub portion and flexible elements, which limit the movement of the hub member when assembled in its operating position.

Figure 4:
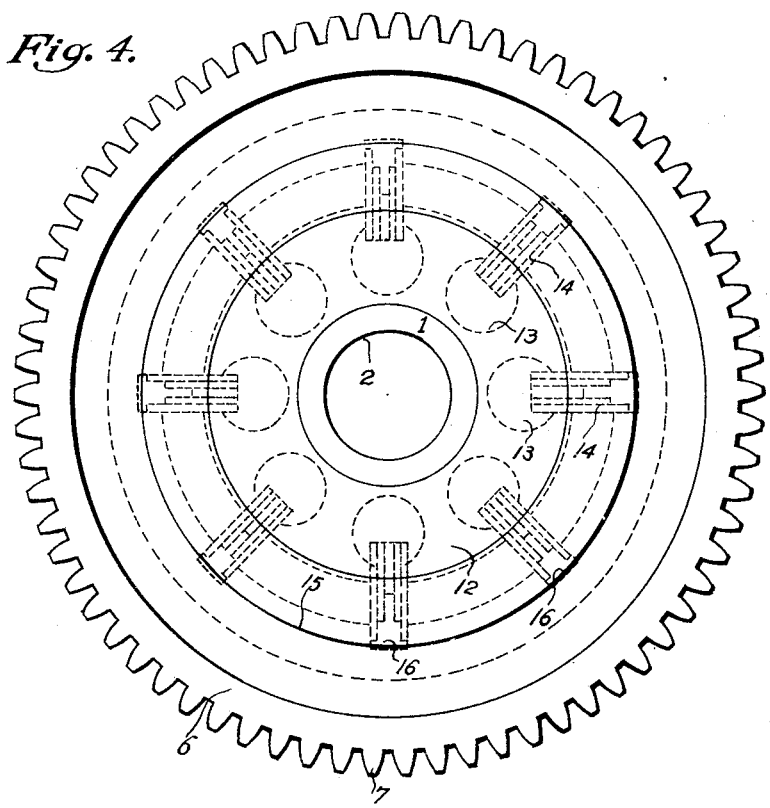
Fig. 4 is an elevational view of a gear-wheel embodying a plurality of flexible elements.
Figure 5:
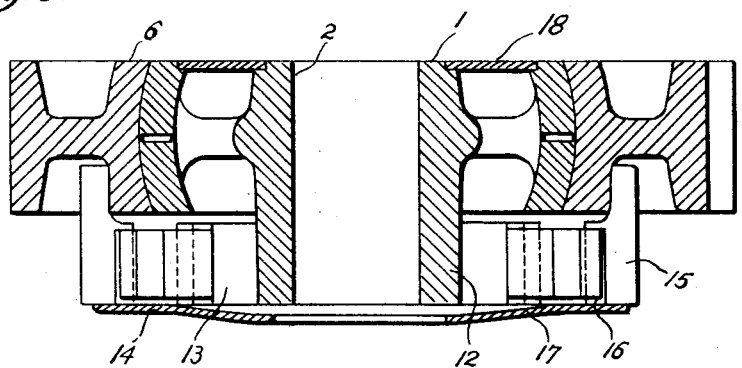
Fig. 5 is a cross-sectional view thereof.

As shown in Figs. 4 and 5, the hub member 1 is provided with an extension 12 having annular recesses 13 adapted to receive spring nests 14 that extend radially and engage a ring 15 having slots 16 therein. Spring plates 17 and 18 are secured to the ring and the rim and to the hub, respectively, to retain the spring nests 14 and to provide a lubricating chamber for grease or oil.

The hub 1 and rim 6 are assembled in the same manner as the structure of Figs. 1, 2 and 3 and the spring elements 14 are assembled after the hub and rim are joined.

It is evident from the foregoing description of my invention that gear wheels made in accordance therewith provide a simple structure that is relatively inexpensive to manufacture, and that such structure facilitates the assembling and manufacture to a highly desirable degree.

Although I have described a specific embodiment of my invention it will be obvious to those skilled in the art that various modifications may be made of the details of hub and rim construction and the manner of assembling and slotting the members without departing from the principles herein set forth.

I claim as my invention:—

1. A flexible gear-wheel comprising a hub and a rim having a spherically-curved joint, and the latter having a plurality of slotted openings to permit extracting the hub from the rim member.

2. A flexible gear-wheel comprising a hub and a rim resiliently joined thereto and means for maintaining parallel alinement of the gear teeth and the hub axis irrespective of the position of the latter, said rim having a plurality of slotted openings to permit extracting the hub therefrom.

3. A flexible gear-wheel comprising a hub and a rim resiliently joined thereto and means for maintaining parallel alinement of the gear teeth and the hub axis irrespective of the position of the latter, said rim having a plurality of slotted openings corresponding to the thickness of the hub to permit extracting the latter when registered therewith.

4. A flexible gear-wheel comprising a hub having a radially extending flange portion provided with a convex outer surface of the same radius as the hub, a rim member having a correspondingly shaped seating surface mounted thereon, a plurality of spring members associated with said hub and rim to yieldingly restrain the movement of the rim on the hub, said rim having slotted openings to permit extracting the hub therefrom.

In testimony whereof, I have hereunto subscribed my name this 23rd day of August, 1923.

CLAUDE BETHEL.